No. 811,345. PATENTED JAN. 30, 1906.
H. WAXMAN.
TIRE PROTECTOR.
APPLICATION FILED NOV. 3, 1904.
2 SHEETS—SHEET 1.
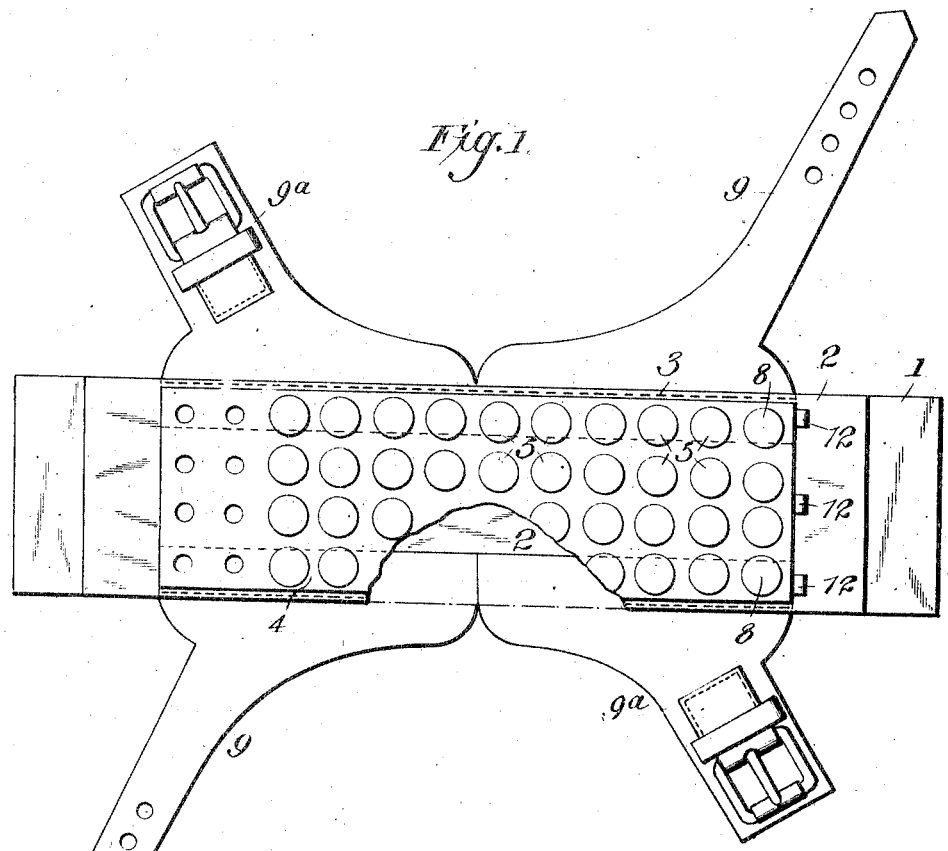
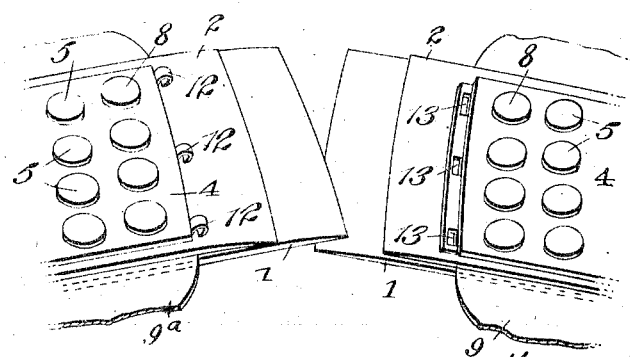
Witnesses
Inventor
Attorney

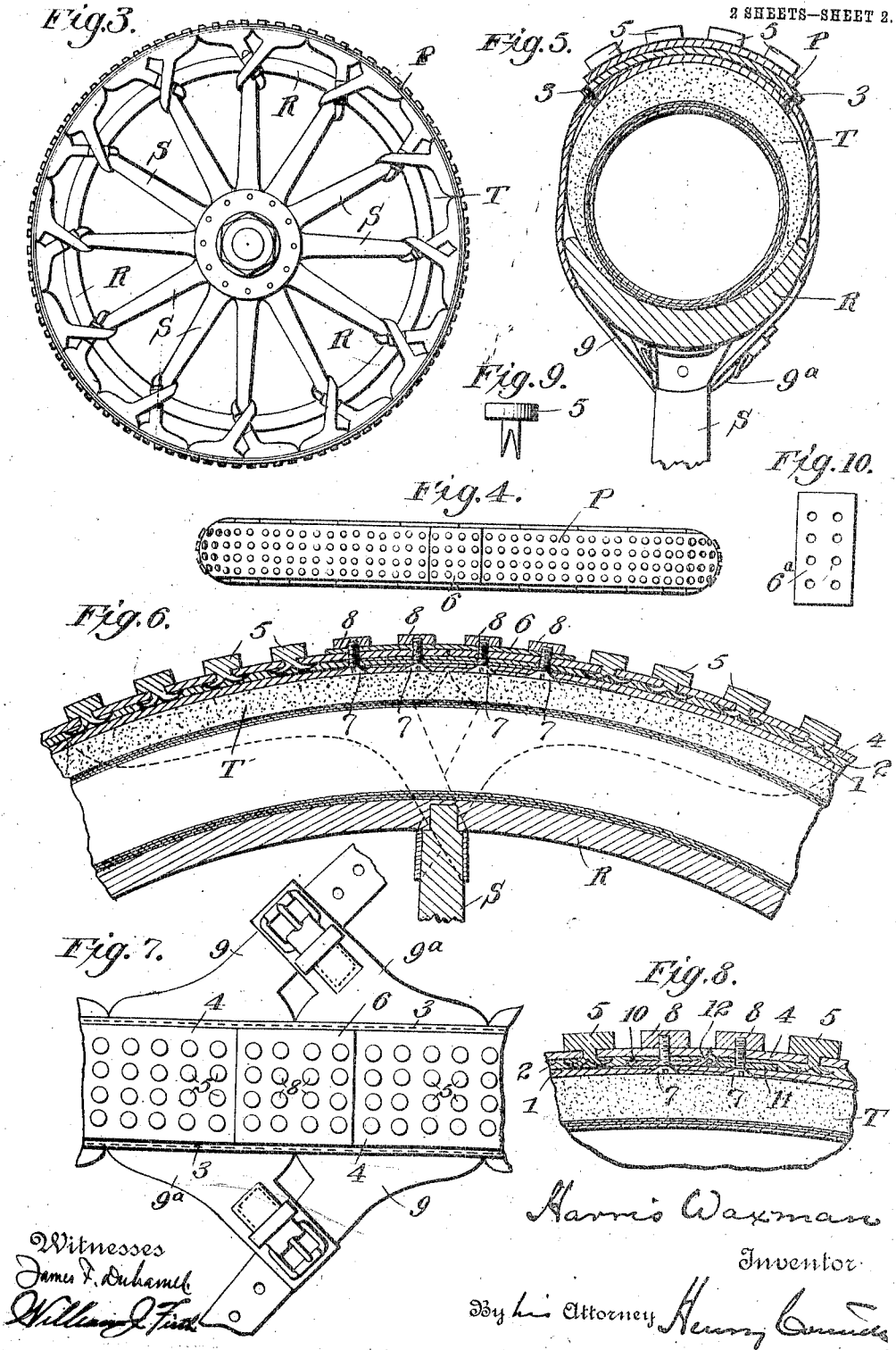

UNITED STATES PATENT OFFICE.

HARRIS WAXMAN, OF NEW YORK, N. Y.

TIRE-PROTECTOR.

No. 811,345.  Specification of Letters Patent.  Patented Jan. 30, 1906.

Application filed November 3, 1904. Serial No. 231,239.

*To all whom it may concern:*

Be it known that I, HARRIS WAXMAN, a citizen of the United States, residing in the city, county, and State of New York, have invented certain new and useful Improvements in Tire-Protectors, of which the following is a specification.

This invention relates to means for protecting rubber tires, and especially pneumatic tires for automobiles, from punctures and undue wear. Such protectors are also provided with means which serve to prevent skidding and to enable the tire to get better traction effect in climbing hills. The protector, being secured about the wheel-rim, serves also to hold the tire in place.

According to the present invention the protector is shown as composed of sections each of which is secured independently to the tire and may be removed if injured and replaced by a fresh section. These sections are, however, joined together end to end to form a complete endless band.

In the accompanying drawings, which illustrate an embodiment of the invention, Figure 1 is a plan view of one of the sections of the protector. Fig. 2 is a perspective view showing the hinge connection for the sections. Fig. 3 is a side elevation, on a small scale, of a wheel provided with the protector; and Fig. 4 is an edge or plan view of same. Fig. 5 is a cross-section of the wheel-rim, tire, and protector. Fig. 6 is a section taken longitudinally of the tire and protector. Fig. 7 is a plan of parts of two sections of the protector, taken at the main connection of the sections. Fig. 8 is a section similar to Fig. 6, taken at the hinge connection between two sections. Fig. 9 shows the preferred form of stud or rivet; and Fig. 10 shows, detached, the narrower coupling-plate.

It has been stated that the protector is herein shown as made in sections, and by preference there will be as many sections as there are spokes in the wheel of the vehicle, the length of the sections varying in each wheel according to the diameter of the wheel. The sections are connected together end to end as they are placed on the tire. As the sections will all be practically alike, a detailed description of one will suffice for all.

As represented in Fig. 1, which shows the outer face of the section when flattened out, and Figs. 5 and 6, which are sections, 1 is a strip or inner ply of some strong fabric—as pliable leather, for example. 2 is an intermediate strip or ply of the same stitched at 3 to the ply 1—that is, along the margins of the plies or strips. These strips may be, for an automobile-tire, about three and one-half to four inches wide. Applied to the outer face of the strip 2 is an outer ply or strip 4 of similar material, but made a little narrower than the plies 1 and 2. This outer ply 4 is studded with headed rivets 5. These rivets pass through the ply 2 also and are clenched down upon the inner face of the latter—that is to say, the two plies 2 and 4 are connected by the rivets or studs 5, and then the plies 1 and 2 are connected by the two rows of stitches 3. At the ends where two of the sections come together the outer plies 4 of the sections abut end to end, Figs. 6 and 8; but by preference the plies or strips 1 and 2 will extend out, Fig. 1, and be beveled or skived down, so that those of one section may overlap those of the adjacent section, as indicated in Figs. 6 and 8.

One securing means for connecting together the ends of adjacent sections when placed is illustrated in Figs. 6 and 7. A rather thin metal plate 6 is placed so as to overlap the abutting ends of the plies 4 of the two sections, and screws 7 are passed up or outwardly through all the plies 1, 2, and 4 and through holes in the plate 6, where they screw into cap-nuts 8, which will by preference correspond in size to the heads of the rivets 5.

The section is preferably secured in place on the tire T by means of straps and buckles, as seen in Figs. 1, 3, and 7. On each side of the section is a perforated strap 9 and on each side also a strap 9ª, provided with a buckle, and these straps project, as seen in Figs. 1 and 7, obliquely from the section, those on the same side diverging. When the section is applied, the straps are brought about under the wheel-rim R and crossed in such a manner as to take about the spoke S of the wheel at the junction of two sections of the protector P—that is to say, a pair of straps at one end of a section take about a spoke S and a pair of straps at the end of the adjacent section take about the same spoke, the straps of adjacent sections interlacing in some degree. At its wider attaching end each strap has a width equal to about one-half the length of the section, so that the two straps extend practically the entire length of the section. They will be secured preferably by beveling or skiving down their broader ends and inserting them between the plies 1 and 2, where they are firmly held by the stitches 3, as seen in Fig. 5.

The means for securing the sections together which has been described may be employed for connecting all of the sections together to form an endless band; but it is preferred to connect the sections by a hinge device (seen in Figs. 2 and 8) and then to connect the two ends into an endless band by the plate 6 and screws 7. The hinge device referred to consists of two metal plates 10 and 11, the former provided with marginal hooks 12 and the other with marginal eyes 13 to engage said hooks. These plates are inserted between the plies 2 and 4 at the respective ends of the section and are secured by screws and cap-nuts in the same manner as the plate 6. It must be understood, however, that these are not the only devices by which the plates 10 and 11 may be secured to the sections.

Fig. 1 shows the detachable hook-fastening at one end and at the other or left-hand end the means for securing the sections together by a plate with screws and nuts.

In Figs. 4, 6, and 7 the plate 6 is represented as wide enough to receive four rows of screws 7, two rows in each section, and this is the preferred normal construction. Fig. 10, however, shows a plate 6ª with but two rows of screw-holes, and the purpose of providing two such plates is this: If the user should find a little slackness in his protector, he may remove it, cut away the ends of the leather at the joint until the plate 6ª can be applied, and substitute it for the plate 6.

Thick and rather pliable leather is preferred for the protector and steel or iron rivets for studding it. The outer ply or strip 4 may be of heavier and harder leather than the others. The particular kind of tire is not material to the invention; but the protector will work equally well on a tire with a flat tread.

The straps 9ª are shown provided with ordinary buckles; but the particular fastening means for the straps is not important. As the securing-straps extend the entire length of the section of the protector, it will be obvious that these straps need not be cut separately except as a matter of economy in material. Indeed, all four of the straps might as well be in one piece, and in that case they could substitute the intermediate ply 2.

Having thus described my invention, I claim—

1. A protector for a rubber tire, made up of plies of strong, flexible material and provided at its ends, which are united to form an endless band, with an overlapping metal plate and securing screws and nuts, said protector being provided also with metal rivets having exposed heads, and some of the plies of the material overlapping at the joint where the ends of the protector are joined together.

2. A protector for a rubber tire, composed of sections, said sections each being composed of an inner ply, an outer ply, and an intermediate ply, all of tough, flexible material, the inner and intermediate plies being connected by marginal rows of stitching and the intermediate and outer plies connected by headed rivets, the said rivets, straps with buckles on the respective edges of the section for securing it to the tire, and means for securing the sections together end to end when in place.

3. A protector for a rubber tire, composed of sections, one for each spoke in the wheel, and each section having two straps at each edge near its end; said straps projecting obliquely from the section and those on the same side diverging.

4. A protector for a rubber tire composed of sections provided with hook-and-eye fastenings for connecting the several sections together detachably, the terminal sections having the joint between them overlapped by a plate secured by screws and nuts, each of said sections being made up of plies of strong flexible material and some of said plies overlapping at the joint.

In witness whereof I have hereunto signed my name, this 1st day of November, 1904, in the presence of two subscribing witnesses.

HARRIS WAXMAN.

Witnesses:
HENRY CONNETT,
HENRY G. HOSE.